United States Patent [19]
Scheu

[11] Patent Number: 5,439,049
[45] Date of Patent: Aug. 8, 1995

[54] METHOD FOR CONTROLLING SLUGGISH HEATING AND COOLING SYSTEMS FOR BUILDINGS

[76] Inventor: Walter Scheu, Bubenhaldenstr. 65, 70469 Stuttgart, Germany

[21] Appl. No.: 101,613

[22] Filed: Aug. 3, 1993

[30] Foreign Application Priority Data

Aug. 3, 1992 [DE] Germany ............ 42 25 622.4
Mar. 16, 1993 [DE] Germany ............ 43 09 946.7

[51] Int. Cl.⁶ ........................... F25B 29/00
[52] U.S. Cl. ........................... 165/22; 165/28; 165/40; 236/91 F
[58] Field of Search ............ 165/11.1, 12, 14, 20, 165/22, 27, 28, 30, 32, 39, 40; 62/159; 236/91 D, 91 F

[56] References Cited
U.S. PATENT DOCUMENTS 3,952,796  4/1976  Larson ...................... 165/40
4,061,483 12/1977  Burg ........................ 165/20
4,293,028 10/1981  Knoll ....................... 165/22
4,479,604 10/1984  Didner ...................... 165/22
4,577,977  3/1986  Pejsa ...................... 165/11.1

FOREIGN PATENT DOCUMENTS
4027833  1/1991  Germany .

Primary Examiner—Ira S. Lazarus
Assistant Examiner—Daniel J. O'Connor
Attorney, Agent, or Firm—Robert W. Becker & Associates

[57] ABSTRACT

In a method of controlling a sluggish heating and cooling system for buildings, that due to a high heat capacity reacts with delayed temperature changes, the exterior temperature is measured, an average projected temperature value of the exterior temperature based on previously measured exterior temperatures is extrapolated, and the heating and cooling system is switched based on the average projected temperature value.

7 Claims, 2 Drawing Sheets

METHOD FOR CONTROLLING SLUGGISH HEATING AND COOLING SYSTEMS FOR BUILDINGS

BACKGROUND OF THE INVENTION

The present invention relates to a method for controlling sluggish heating and cooling systems of buildings which by themselves or in connection with heavy building construction react slowly to temperature changes, i.e., they have a high heat capacity. Heavy building construction in this context means constructive designs including heating surfaces of great mass, for example, floor heating systems in which heating elements are embedded in concrete, or steel-reinforced concrete ceilings which are operated as heating and cooling surfaces (German Patent 40 27 833). The sluggishness with respect to temperature changes is additionally compounded by the fact that in buildings of heavy construction, i.e., masonary walls and steel-reinforced ceilings, are provided with good insulating materials, as is more and more the case in modern construction. Depending on the sluggishness of the system, a couple of hours often go by before switching on or off the heating or cooling system is noticable within the building. The control of sluggish heating and cooling systems is therefore very difficult.

Methods for controlling sluggish heating systems, especially for floor heating systems of the aforementioned kind, are known. They turn on the heat-generating and heat-distribution means when the measured temperature within the heating system $T_{actual}$, for example, at the heating surfaces, is smaller than the preset nominal temperature $T_{Hnominal}$:

$$T_{actual} < T_{Hnominal}$$

In these cases, the required temperature at the heating surfaces $T_{Hnominal}$ must be lower the higher the exterior temperature is. When this known relation is represented in a coordinate system (FIG. 1), wherein the abscissa represents the exterior temperature $T_E$ and the ordinate represents the corresponding nominal temperature $T_{Hnominal}$, a connecting line of all required heating surface temperature $T_{Hnominal}$ which, for increasing exterior temperatures, is a descending curve, the so-called heating curve. In very well insulated buildings with very large heating surfaces the curve is very flat and can be approximated by a straight line.

The required temperatures at the heating surfaces however not only depend on the exterior temperatures, but also on the quality of the heat insulating materials and the required amount of external air for the building as well as on the kind and size of the heating and cooling surfaces.

These parameters determine the slope of the approximated straight line of the heating curve. The slope is smaller the better the heat insulation of the building.

It is also known that internal and solar heat gains displace this straight line within the coordinate system parallel upwardly or downwardly and thus reduce or increase the intercept which in FIG. 1 is indicated at $b_H$.

The equation for the straight line of the heating curve is thus $$T_{Hnominal} = T_E \times a_H + b_H$$

wherein
$T_{Hnominal}$ is the required heating surface temperature depending on the exterior temperature,
$T_E$ is the measured exterior temperature,
$a_H$ is the selectable slope of the heating curve (flat curve for good heat insulation and/or for greater heating surfaces),
$b_H$ is the selectable value of the parallel displacement, i.e., the intercept (greater value for smaller internal and solar heat gains).

It is known that the condition for switching on the heating means is fulfilled when $$T_{actual} < T_E \times a_H + b_H.$$

In analogy, the cooling system is activated when the actual temperature surpasses the nominal cooling temperature $T_{Knominal}$, whereby the nominal cooling temperature as a function of the external temperature can also be approximated as a straight line (FIG. 2). The parameters $a_K$ and $b_K$ can be, but must not be identical to the corresponding values for the heating curve $a_H$ and $b_H$. In contrast to the heating operation, in which for a greater exterior temperature the room temperature is maintained approximately at a constant value, usually at 21° C., during the cooling operation the temperature difference between the exterior temperature and the room temperature may not be too great in order to prevent the risk of catching cold for the users of the building. Accordingly, different slopes for the heating and cooling curves result, as is known in the prior art. In contrast to the heating operation in which the heating surfaces for the purpose of releasing heat must be at all times hotter than the room to be heated, during cooling operation the temperature of the cooling surfaces for the purpose of dissipating heat must always be below the temperature of the room to be cooled. Thus, the value for the intercept of the cooling curve must be smaller than the intercept of the heating curve, i.e., $b_K$ is smaller than $b_H$.

It is furthermore known, as represented in FIG. 3 illustrating both heating and cooling curves from FIG. 1 and FIG. 2 for clarification, that an adjustable range for the exterior temperature exist which, in general, is between 12° and 16° C. in which the building is neither heated nor cooled. This neutral range can be preset and depends also on the temperature sluggishness and the internal and solar heat gains of the building.

As an example for the switching conditions for heating according to the prior art the following is presented:
Presumed Parameters:
Exterior temperature $T_E = +8°$ C.,
Slope of the heating curve $a_H = -0.25$ (i.e., when the exterior temperature drops by 4K., the heating surface temperature must be raised by $0.25 \times 4K = 1K$.).
Slope $b_H = +26K$. (approximately true for great heating surfaces and good heat insulation).

From this the condition for switching on heating results as follows:

$$T_{actual} < +8° C. \times (-0.25) + 26K.$$

$$T_{actual} < +24° C.$$

Such a known control however cannot prevent in sluggish systems that, for example, in a cool night the building is heated and the next day, when the sun is shining, the building is too hot. For the present conventional, somewhat less sluggish heating systems these controls may be sufficient. However, energy saving efforts have become increasingly more important and require improved and better heat insulation. Better insulation in connection with heavy building construction results in heated buildings requiring longer and longer cooling periods, respectively, the cooled building requiring increasingly longer heating periods. Heating and cooling systems accordingly react increasingly sluggish, independent of how reactive and fast the heating and cooling system alone would be. A control process according to the aforedescribed principle thus takes effect only after a certain period of time which depends on the sluggishness of the system.

It is therefore an object of the present invention to provide a method for controlling a sluggish heating and cooling system for buildings, which, due to a high heat capacity, reacts only sluggishly to temperature changes and whose nominal temperature is represented as a function of the exterior temperature, such that a heating or cooling process does not disfavorably take effect at a time later than the desired nominal time due to the sluggishness of the building, i.e., at a time when the heating or cooling effect is no longer needed.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
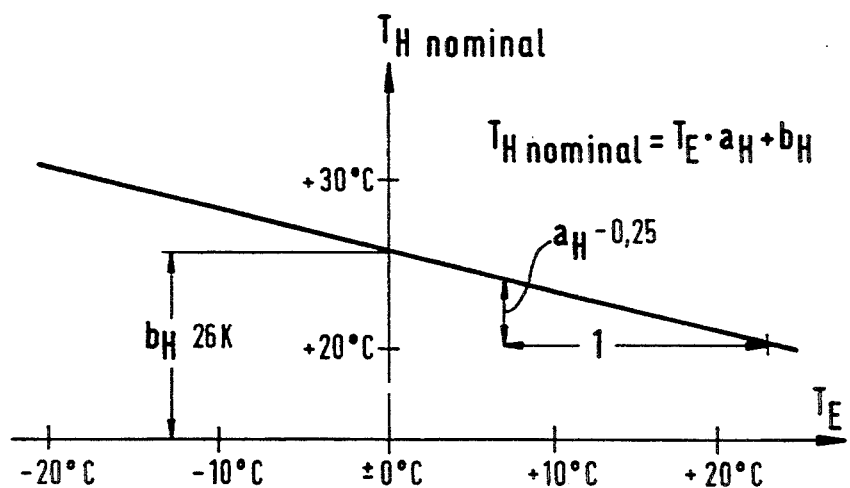
FIG. 1 shows a heating curve of the prior art.
Figure 2:
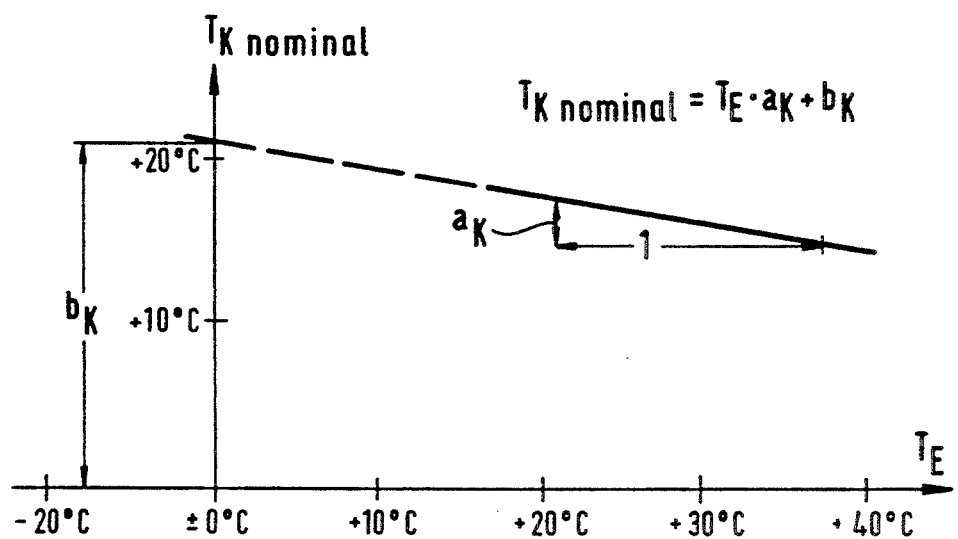
FIG. 2 shows a cooling curve of the prior art.
Figure 3:
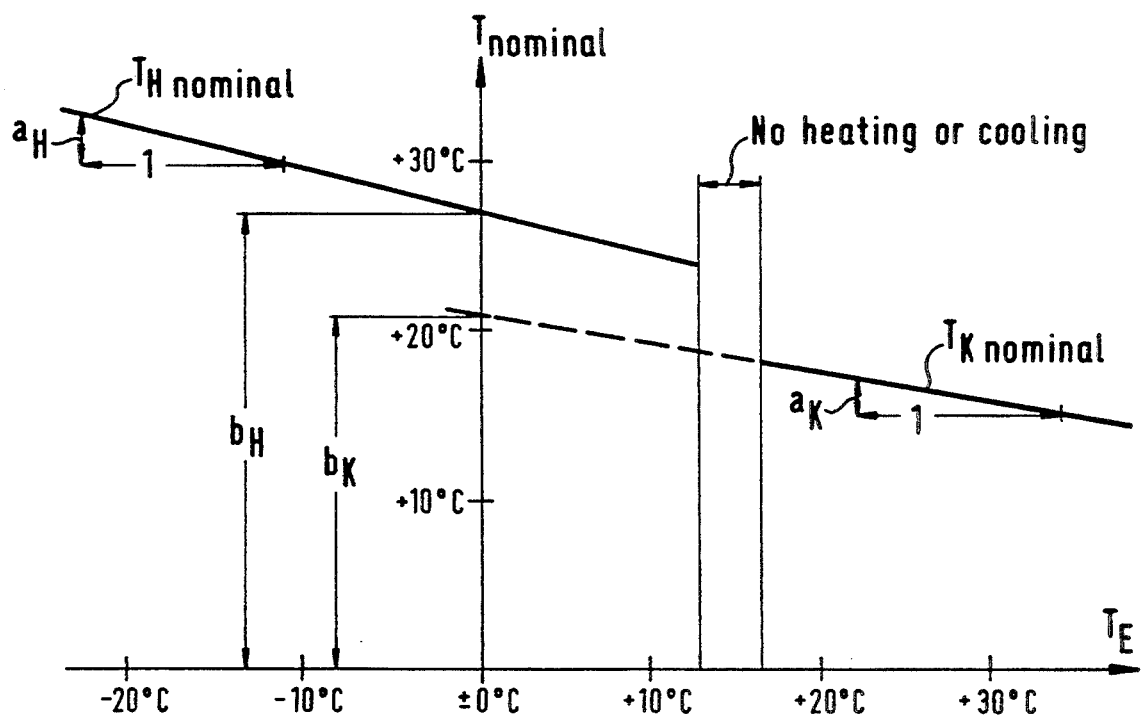
FIG. 3 is a representation of the heating and cooling curves for controlling a building according to the prior art.

The method of controlling a sluggish heating and cooling system for buildings according to the present invention is primarily characterized by the following steps:

Measuring the exterior temperature;

Extrapolating an average projected temperature value of the exterior temperature based on previously measured exterior temperatures; and Switching the heating and cooling system based on the average projected temperature value.

Preferably, the method further comprises the following steps:

Defining a first nominal temperature value ($T_{AP} \times a_K + b_K$) for activating cooling and a second nominal temperature value ($T_{AP} \times a_H + b_H$) for activating heating;

Measuring an actual interior temperature $T_{actual}$;

Comparing the actual interior temperature to the first and the second nominal temperature values and activating heating when $$T_{actual} < (T_{AP} \times a_H + b_H) \text{ and}$$

Activating cooling when $T_{actual} < (T_{AP} \times a_K + b_K)$; wherein $a_H$ and $a_K$ may be different and wherein $b_H$ is greater or equal to $b_K$.

Expediently, the exterior temperature is measured at an interval c between a first time $t_1$ and a second actual time $t_2$.

Advantageously, the method further comprises the step of:

Calculating after completion of each measuring step of the exterior temperature the average exterior temperature for all measured exterior temperatures of a 24 hour period, with the average exterior temperature at the first time $t_1$ designated as $T_{A1}$ and the average exterior temperature at the second actual time $t_2$ designated as $T_{A2}$.

In a further embodiment of the present invention, the method comprises the step of extrapolating at the second actual time $t_2$ the average projected temperature valve $T_{AP}$ at a future time $t = t_2 + d$, with d representing a time interval between the second actual time $t_2$ and the future time t.

The average projected temperature $T_{AP}$ is preferably extrapolated at the future time t as a function of the average exterior temperatures $T_{A1}$ and $T_{A2}$ at the first time $t_1$ and the second actual time $t_2$ according to $T_{AP} = T_{a1} + (T_{A2} - T_{A1}) \times d/c$.

Preferably, heating is activated when $$T_{actual} < [T_{A2} + (T_{A2} - T_{A1}) \times d/c] \times a_H + b_H,$$

and cooling is activated when $$T_{actual} > [T_{A2} + (T_{A2} - T_{A1}) \times d/c] \times a_K + b_K.$$

With the inventive method it is prevented that on hot days the building must be cooled, when the cooling process takes effect at night due to its sluggishness when it is no longer needed. Accordingly, the day/night fluctuations are not considered. However, especially for very sluggish systems it is mandatory that the day/night temperature fluctuations be eliminated in order to prevent that during the day the effect takes place which would have been appropriate for the cooler night. Furthermore, the exterior temperatures must be extrapolated such that due to the sluggishness of the system a delayed heating or cooling effect occurs at the right time, i.e., that a trend to hotter or cooler weather is predicted and taken into consideration.

In the inventive method instead of the actual exterior temperatures, an average projected exterior temperature value is being used for the switching of the heating and cooling system which temperature value corresponds to a temperature to be expected after the lapse of time resulting from the delay of the system due to its sluggishness.

Figure 4:
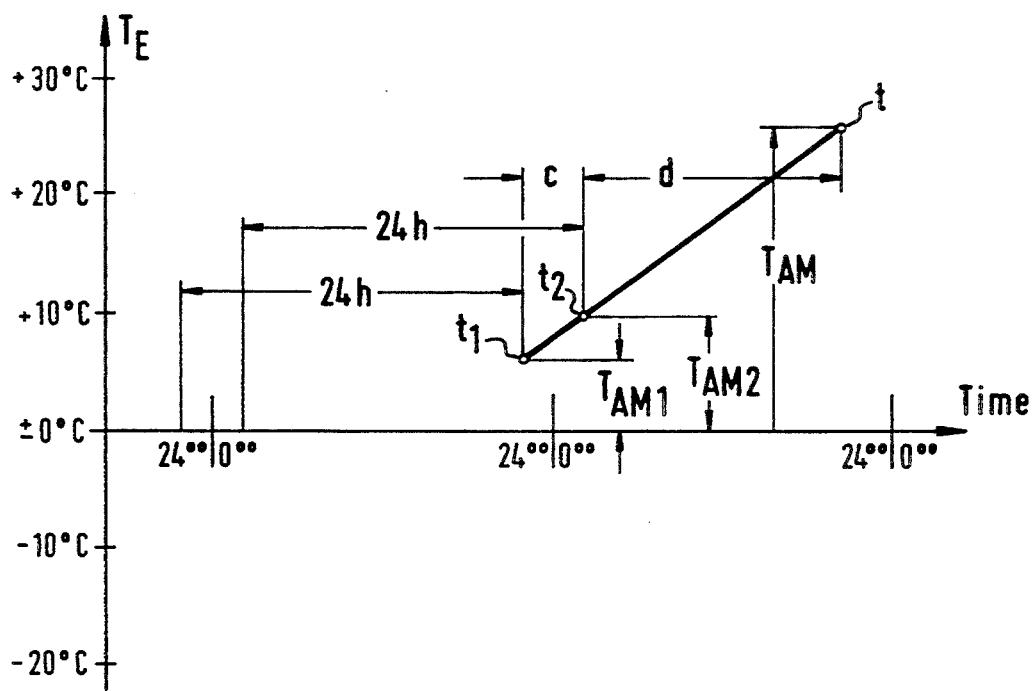
FIG. 4 is a schematic representation of the method of the present invention illustrating the intervals at which measurements of the exterior temperature take place and the projected average temperature.

As can be seen in FIG. 4, for such an anticipating control the exterior temperature is measured at uniform time intervals indicated with c and an exterior average temperature for the previous 24 hour period is calculated. By basing the exterior temperature on such 24 hour average temperatures it is ensured that switching on and off the heating and cooling system takes place based on general exterior temperatures which are independent of the day and night rhythm. It is thus prevented that due to momentary strong fluctuations of the exterior temperature between day and night the heating and cooling system is constantly switched on and off and the heating or cooling effect within the building occurs at the wrong time.

In order to take into consideration the sluggishness of the system, the actual measured exterior temperature is not used as the base for determining the switching conditions for heating or cooling, but the exterior average projected temperature value to be anticipated after a period of time d (FIG. 4) corresponding to the sluggishness of the system. For this purpose, the two last measured exterior temperatures spaced apart by the time interval c are compared to one another by saving the previously determined average temperature value $T_{A1}$ at the time $t_1$ until the following average exterior value $T_{A2}$ at the actual time $t_2$ is saved. When comparing the two values the projected average exterior temperature $T_{AP}$ is calculated based on a generally linear extrapolation at a time d which corresponds to the sluggishness of the system. The calculation is carried out according to $$T_{AP} = T_{A1} + (T_{A2} - T_{A1}) \times d/c$$

wherein:

$T_{AP}$: the average projected temperature valve at the time $t = t_2 + d$, $T_{A1}$: the average value of the exterior temperature at the time $t_1$ and the previous 24 hour period determined by continuously performing measurements of the exterior temperature;

$T_{A2}$: the average value of the exterior temperature at the time $t_2$ for the previous 24 hour period to be determined by continuously performing measurements of the exterior temperature;

c: selectable time interval between $t_1$ and $t_2$;

d: selectable time between $t_2$ and the time t corresponding to the sluggishness of the system for the projected average temperature $T_{AP}$.

When this average projected temperature valve $T_{AP}$, which is determined at the actual time $t_2$ for a future time t, is used instead of $T_E$ in the aforementioned equation for activating cooling or heating, the following results:

Activating cooling $$T_{actual} < [T_{A2} + (T_{A2} - T_{A1}) \times d/c] \times a_H + b_H$$

Activation of cooling $$T_{actual} > [T_{A2} + (T_{A2} - T_{A1}) \times d/c] \times a_K + b_K.$$

As an example for the activation of the heating system the following parameters are given:

$T_{A1} = +7°$ C. at the time $t_1$
$T_{A2} = +8°$ C. at the actual time $t_2 = t_1 + c$
c = 2 hours
d = 18 hours
$a_H = -0.25$
$b_H = +26K.$
$T_{actual} < [+8°$ C. $+(8°$ C. $= 7°$ C.$) \times 18$ h/2 h$] \times (-0.25) + 26K.$
$T_{actual} < +21.75°$ C.

The aforedescribed method is programmed into conventionally obtainable computer controlled control devices. With the measured values and due to the aforedescribed method the control device then switches anticipatorily the heating and cooling system.

The advantages resulting from the present invention are as follows:

The daily fluctuations of the exterior temperatures between day and night of approximately 6K. to 12K. no longer can lead to heat generation at night and overheating of the building on a subsequent hot day. Due to the extremely long cooling and heating periods of buildings with heavy building construction including heat conserving and well insulating materials, fast adaptations to the fluctuations of exterior temperatures between day and night are no longer necessary.

The inventive control is able to detect due to the change between two average exterior temperatures of a 24 hour period, which may be determined only two hours apart, whether a general warming or cooling trend of the weather is present. The control can take these trends into consideration: the heating or cooling is already switched on or off when this is not yet necessary according to the actual exterior temperature and the temperature at the heating or cooling system, which, however, with respect to the trend for a general warming or cooling of the weather may be necessary within, for example, 18 hours. With the aid of the anticipatory measurement of the exterior temperature it is prevented that for sluggish systems the effect of heating or cooling lags behind the needs.

Due to the relatively small timely interval of the measurements and the calculations of the 24 hour average value for the exterior temperature it is thus continuously controlled whether a heating or cooling operation should be maintained or interrupted.

The inventive method for controlling heating and cooling systems is especially expedient for buildings of a heavy construction with good heat insulation and is mandatory for sluggish heating and cooling systems that are advantageous with respect to the substitution of fossil fuels. Only with the inventive control the operation of such environmentally favorable systems, as described in German Patent 40 27 833, is possible.

The present invention is, of course, in no way restricted to the specific disclosure of the specification and drawings, but also encompasses any modifications within the scope of the appended claims.

What I claim is:

1. A method of controlling a sluggish heating and cooling systems for buildings that reacts due to a high heat capacity with delay to temperature changes, wherein a nominal interior temperature is represented as a function of an external temperature, said method comprising the steps of:

measuring the exterior temperature;

extrapolating an average projected temperature value of the exterior temperature based on previously measured exterior temperatures; and switching the heating and cooling system based on the average projected temperature value.

2. A method according to claim 1, further comprising the steps of:

defining a first nominal temperature value ($T_{AP} \cdot a_K + b_K$) for activating cooling and a second nominal temperature value ($T_{AP} \cdot a_H + b_H$) for activating heating;

measuring an actual interior temperature $T_{actual}$;

comparing the actual interior temperature $T_{actual}$ to said first and said second nominal temperature values and activating heating when $$T_{actual} < (T_{AP} a_H + b_H),$$

and activating cooling when $$T_{actual} > (T_{AP} a_K + b_K),$$

wherein $a_h$ and $a_k$ are different and wherein $b_H$ is $\geq b_K$.

3. A method according to claim 1, further comprising the step of:
  measuring the exterior temperature at an interval c between a first time $t_1$ and a second actual time $t_2$.

4. A method according to claim 3, further comprising the step of:
  calculating after completion of each measuring step of the exterior temperature the average exterior temperature for all measured exterior temperatures of a 24 hour period, with the average exterior temperature at the first time $t_1$ designated as $T_{A1}$ and the average exterior temperature at the second actual time $t_2$ designated as $T_{A2}$.

5. A method according to claim 4, further comprising the step of:
  extrapolating at the second actual time $t_2$ the average projected temperature value $T_{AP}$ at a future time $t=t_2+d$, with d representing a time interval between the second actual time $t_2$ and the future time t.

6. A method according to claim 5, further comprising the steps of:
  extrapolating the average projected temperature value $T_{AP}$ at the future time t as a function of the average exterior temperatures $T_{A1}$ and $T_{A2}$ at the first $t_1$ and the second actual time $t_2$ according to $$T_{AP} = T_{A1} + (T_{A2} - T_{A1}) \cdot d/c.$$

7. A method according to claim 6, further comprising the steps of:
activating heating when $$T_{actual} < [T_{A1} + (T_{A2} - T_{A1}) \cdot d/c] a_H + b_H, \text{ and}$$

activating cooling when $$T_{actual} > [T_{A1} + (T_{A2} - T_{A1}) \cdot d/c] a_K + b_K.$$

* * * * *